May 19, 1970     A. PENNIMAN     3,512,686
CARAFE LID ASSEMBLY
Filed Feb. 23, 1968     2 Sheets-Sheet 1
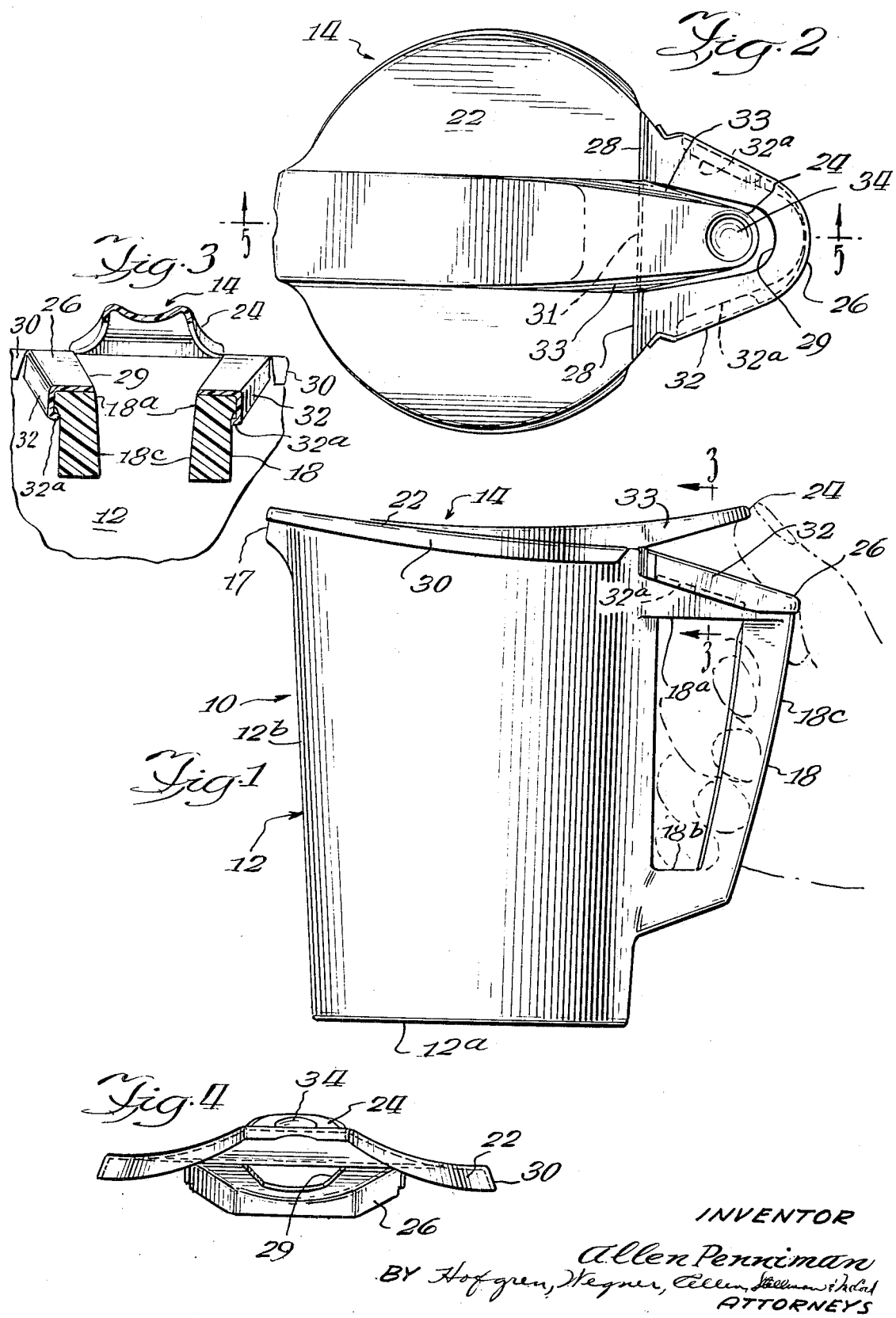
INVENTOR
Allen Penniman
BY Hofgren, Wegner, Allen, Stellman & McCord
ATTORNEYS May 19, 1970  A. PENNIMAN  3,512,686
CARAFE LID ASSEMBLY
Filed Feb. 23, 1968  2 Sheets-Sheet 2
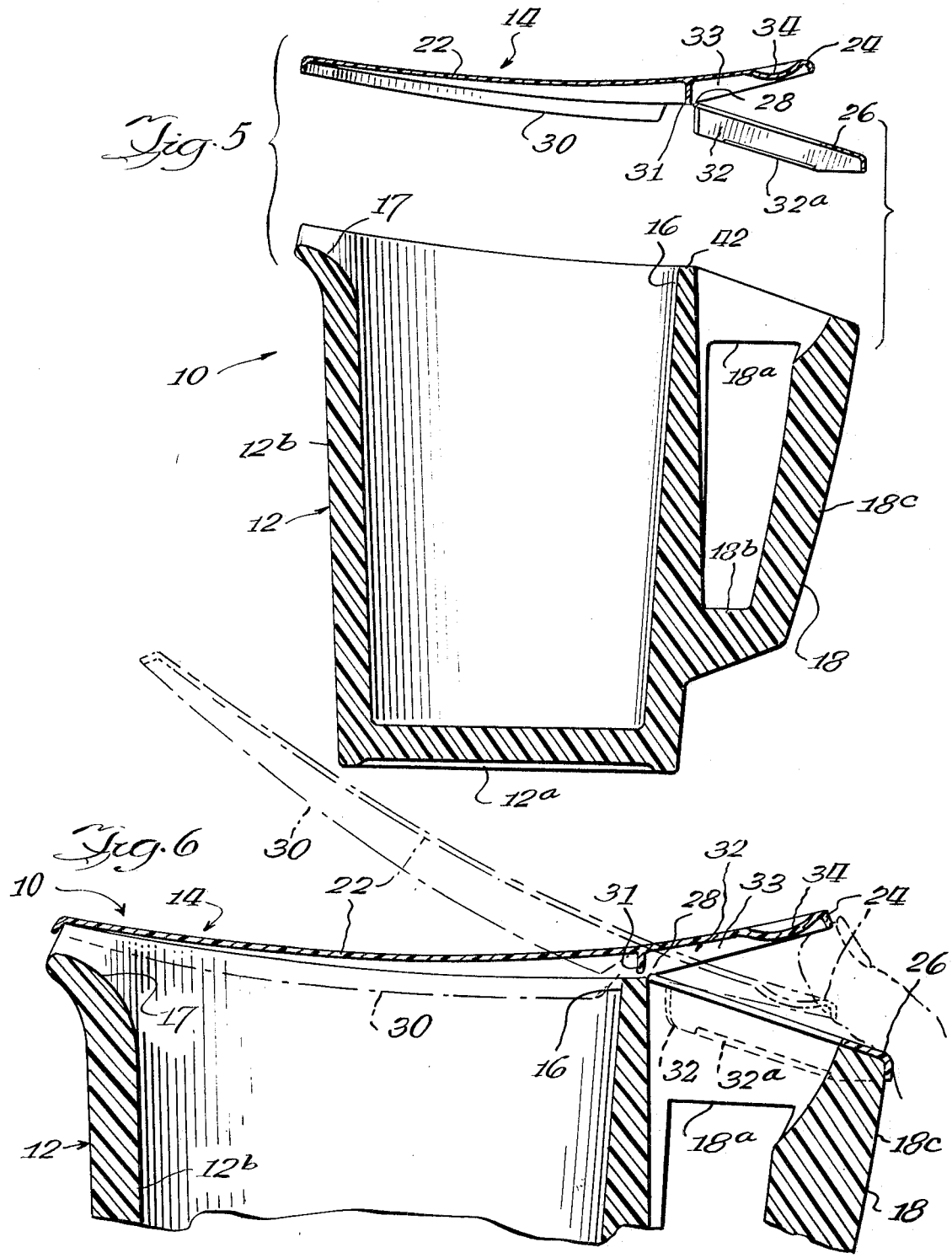

United States Patent Office 3,512,686
Patented May 19, 1970

3,512,686
CARAFE LID ASSEMBLY
Allen Penniman, St. Louis, Mo., assignor, by mesne assignments, to Sherwood Medical Industries Inc., Chicago, Ill., a corporation of Delaware
Filed Feb. 23, 1968, Ser. No. 707,794
Int. Cl. A47g 19/14
U.S. Cl. 222—472     4 Claims

ABSTRACT OF THE DISCLOSURE

A lid assembly and a carafe having a base with a gripping handle, the lid including a cover portion hinged to a handle portion characterized in that the lid is freely pivotable in the area of the juncture of the cover portion and handle portion of the lid and the cover portion of the lid has an extension projecting over the handle area so that the cover portion may be raised by depressing the extension and returned to a closed position by gravity.

BACKGROUND OF THE INVENTION

Field of the invention

This invention relates to serving vessels and the like and more particularly, to a carafe-type serving vessel and associated lid assembly therefor.

Description of the prior art

Examples of art in this field relating to similar devices are the patents issued to Emmert et al. No. 2,805,561; Bernhardt No. 3,157,322; Underwood No. 3,168,326; and Brocken No. 3,201,011. These patents show containers with pivoted lids adapted to be opened by depressing a portion of the lid but they generally require a lug and slot relationship between the lid and the container to hold the lid onto the container.

SUMMARY OF THE INVENTION

This invention is directed, in brief, to the provision of a carafe having a base with a handle and an open end, and a lid for the base, the lid having a cover portion spanning the open end and pivoted to a handle portion connected to the handle of the base, the cover portion having an extension projecting over the handle portion for pivoting the cover portion to an open position by depressing the extension.

BRIEF DESCRIPTION OF THE DRAWINGS

FIG. 1 is a side elevational view of the carafe and lid assembly of this invention;

FIG. 2 is a top plan view of the carafe shown in FIG 1;

FIG. 3 is a fragmentary enlarged sectional view taken generally along the lines 3—3 of FIG. 1;

FIG. 4 is a front elevational view of the lid assembly of this invention;

FIG. 5 is an exploded sectional view of the carafe of this invention taken generally along the lines 5—5 of FIG. 2; and FIG. 6 is a fragmentary enlarged sectional view of the upper portion of the carafe as shown in FIG. 1, illustrating the relationship between the lid and base portion when the lid is in the closed and opened position.

DESCRIPTION OF THE PREFERRED EMBODIMENTS

Carafe or vessel 10 of this invention includes a body portion 12 preferably made of a plastic material of the expanded foam type, with a bottom 12a and upright cylindrical wall structure 12b for holding suitable liquids therein, and a lid 14 of plastic or comparable material adapted for securement to the body and for selectively covering or opening the open end of the body to permit the dispensation or addition of suitable material to the interior of the vessel when desired.

The body 12 has an open end 16 at the top thereof with a spout 17 along one portion of the open end to facilitate dispensation of liquid or the like from the interior of the vessel by a pouring action. Opposite the spout 17, the body 12 is provided with handle structure 18 which, in the illustrated embodiment, includes pairs of spaced upper and lower webs 18a and 18b projecting outwardly from the wall 12b and joined by a generally upright single web 18c. The space between the several webs and the container provides a suitable structure for hand grasping of the handle portion.

Lid 14 includes a cover portion 22 which is generally of a size and shape to cover the open end 16 of the body 12 and a preferably rigid depressor portion 24 which is an integral extension of the cover 22 and includes free end 25 which projects upwardly and outwardly beyond the open end to provide a means for keeping the lid closed by pushing upwardly against the underside thereof with the thumb or a finger. Handle portion 26, is adapted for connection to the handle structure 18 and is integrally pivotally connected to the cover portion 22 along a hinge line 28 which generally overlies a portion of the periphery of the body 16. Handle portion 26 has an opening 29 which underlies, and is slightly larger than, depressor portion 24, permitting the depressor portion 24 to swing downwardly through opening 29. By means of this structure, the cover portion 22 may be swung between a raised position, as shown in dotted outline in FIG. 6, and a closed position, as shown in full outline in FIGS. 1 and 6, by pressing on, and releasing, the depressor portion 24.

Cover portion 22 of lid 14 had an annular lip or flange 30 depending from the periphery thereof for snug engagement with the exterior of the upright wall 12a of the body of the vessel to hold the lid in assembled relationship therewith. A stiffening rib 31 extends between the flanges 33 depending from the periphery of the depressor portion 24 for adding lateral rigidity to the lid 22 and depressor 24. Similarly, the handle portion 26 of the lid 14 is provided with depending lips or flanges 32 of a size and shape to snugly embrace the outer surfaces of the web portions 18a of handle structure 18 to securely hold the handle portion 26 of the lid on the handle 18 of the body 12. If desired, inwardly extending portions 32a may be provided on the lower edge portions of lips 32 for embracing a portion of the underside of web 18a to insure retention of the lid handle portion onto the handle 18 of the body 12. To assist in depressing depressor portion 24, a recessed area 34 may be formed in the top thereof to serve as thumb or finger notch for the application of downward pressure on the depressor portion 24. It is to be understood that preferably the lid is integrally molded as a one-piece structure with all of the portions 22, 24 and 26 thereof formed in a single molding operation, the hinged juncture at 28 between handle portion 26 and the cover portion 22 of the lid being sufficiently thin to permit free pivotal movement of portion 22 relative to portion 26.

This invention provides an economically manufactured serving vessel and cover therefor. Maximum exposure of, and access to, the interior of the vessel is afforded by integrally forming the hinge line in an area between the lid portion and the handle portion so that it is generally coincident with the periphery of the open top in that area. The mass of the lid portion insures that the lid will freely fall to a closed position responsive to gravity upon release of the opposing force on the depressor portion for raising the lid to the open position. The handle portion is provided with means for easily and securely connecting the handle portion to the handle of the vessel to insure that the cover assembly will remain in proper position thereon while at the same time provide a means for easily removing the covered assembly when desired. In use, a thumb or finger can be urged up underneath the depressor portion 25 to hold the lid closed. The last named feature is of particular importance when it is desired to use the lid as a strainer, for instance, when pouring ice water without having the ice flow into the glass from the carafe. By holding the lid closed, the ice is held in and the water flows out of the spout into the glass.

The foregoing detailed description has been given for clearness of understanding only, and no unnecessary limitations should be understood therefrom, as some modifications may be obvious to those skilled in the art.

I claim:

1. In combination: a serving vessel having a bottom, upright walls terminating in an open top and a handle terminating adjacent the open top; said handle having a generally horizontally disposed upper portion, said upper portion being bifurcated at the junction with said upright walls to form an open space therebetween, a closure means having a cover portion and an integrally formed mounting portion, said cover portion being generally of a size and shape to cover to open top of the vessel, said mounting portion having a generally horizontally disposed part and downwardly depending encircling portions adapted to grip the side walls of the bifurcated portion of said handle, an upwardly and rearwardly extending depressor portion rigidly connected to said cover portion and overlapping the plane of said horizontally disposed part of the mounting portion, said mounting portion being hingedly connected to the cover portion and having an opening aligned with the space between said bifurcated portion of said handle, said depressor portion being aligned with and adapted to nest in said opening in said mounting portion when said depressor portion is depressed for opening said cover portion, release of said depressor portion will permit gravity descent of the cover for closing said open top of the vessel, and said cover portion is adapted to be held closed over the open top of the vessel by upward pressure on the underside of said depressor portion.

2. The combination of claim 1, wherein the hinged connection is formed along a line coincident with a portion of the periphery of the open top of the vessel.

3. The combination of claim 2, wherein the depressor portion projects outwardly generally medially of the hinged connection of the cover and handle portion.

4. The combination of claim 2, wherein the depressor portion is generally rigid and projects upwtrdly as well as outwardly from the hinged connection of the cover to the handle portion.

References Cited

UNITED STATES PATENTS

| | | | |
|---|---|---|---|
| 1,229,777 | 6/1917 | Oberholtzer | 220—36 |
| 2,283,488 | 5/1942 | Cox | 220—36 X |
| 1,373,695 | 4/1921 | Wright | 222—470 |
| 2,359,189 | 9/1944 | Alsdorf | 222—470 |
| 2,937,794 | 5/1960 | Quandt | 222—473 |
| 3,168,226 | 2/1965 | Underwood et al. | 222—472 |

SAMUEL F. COLEMAN, Primary Examiner

N. L. STACK, JR., Assistant Examiner

U.S. Cl. X.R.

222—556